United States Patent
Mitra et al.

(10) Patent No.: US 7,327,752 B1
(45) Date of Patent: Feb. 5, 2008

(54) METHOD AND APPARATUS OF UNIVERSAL CROSS CONNECT

(75) Inventors: Somnath Mitra, San Leandro, CA (US); Sanjeev K. Gupta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

(21) Appl. No.: 10/256,525

(22) Filed: Sep. 26, 2002

(51) Int. Cl.
*H04B 7/212* (2006.01)
*H04L 12/66* (2006.01)

(52) U.S. Cl. .................... 370/442; 370/241; 370/352; 370/503

(58) Field of Classification Search ........ 370/352–356, 370/375, 376, 401, 442, 458, 503, 241, 509
See application file for complete search history.

(56) References Cited

U.S. PATENT DOCUMENTS 5,621,720 A * 4/1997 Bronte et al. ............... 370/241

* cited by examiner

*Primary Examiner*—Afsar Qureshi
(74) *Attorney, Agent, or Firm*—Sierra Patent Group, Ltd.

(57) ABSTRACT

Methods and apparatus for achieving universal cross connect for Time Domain Modulated (TDM) data between a first and second data streams each having a corresponding time slot assignment are disclosed. Cross connect may be achieved through the use of a time slot assignment table.

25 Claims, 6 Drawing Sheets

METHOD AND APPARATUS OF UNIVERSAL CROSS CONNECT

BACKGROUND

1. Field of the Disclosure

The disclosure relates generally to data communications, and in particular, to achieving universal cross connect between Time Domain Multiplexed (TDM) data over digital data networks.

2. The Prior Art

A T1 circuit is a long-distance, point-to-point circuit, providing 24 channels of 64 Kbps, giving a total bandwidth of 1.544 Mbps. The standard T1 frame is 193 bits long, made up of twenty-four 8-bit voice samples and one synchronization bit, and is transmitted at a rate of 8000 frames per second. When a T1 service is made available in single 64 Kbps increments, it is known as fractional T1. In Europe, the comparable circuit is known as E-1, and it has a speed of 2.054 Mbps. T1 has been superseded by the CCITT DS-1 designation.

However, many customers do not need the bandwidth provided by a full T1 circuit, and instead lease a fractional T1, or a one or more portions of a T1 circuit. A T1 circuit has a capacity of 1.544 Mbps, the equivalent of twenty-four 64 Kbps channels. Customers can lease as many of these 64 Kbps channels as they need; they are not required to lease the entire 1.544 Mbps circuit.

Figure 1:
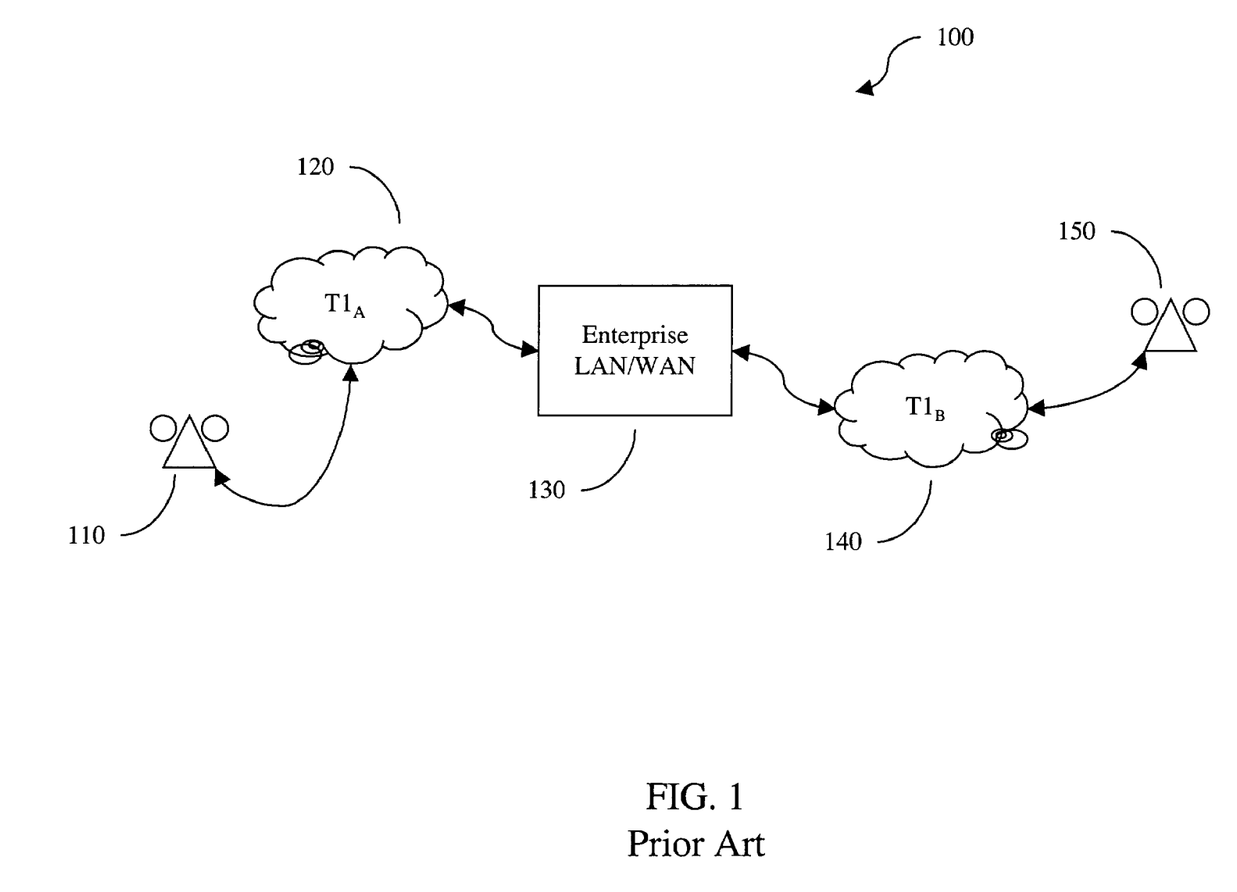
FIG. 1 is a conceptual block diagram of a prior art system in which users are communicating over distinct T1 circuits.

FIG. 1 is a prior art diagram of an enterprise system 100 coupling a first user 110 to a second user 150 through an enterprise network 130, such as a LAN or WAN as is known in the art. In the example of FIG. 1, the users 110 and 150 are coupled to the enterprise network 130 through distinct T1 circuits $T1_A$ (120) and $T1_B$ (140), respectively.

FIG. 1 illustrates one application providing voice applications over distinct T1 lines, which are data only.

For example, in the system of FIG. 1, an external phone call placed by user 110 may come in over T1 circuit 120 destined for user 150 over T1 circuit 140.

To interface time-division multiplexed data between distinct T1 circuits, the enterprise network must perform time slot assignment. When a customer leases a partial T1 circuit, partial circuits of separate or distinct time slots must also be properly interfaced. This is typically accomplished using a time-slot assigner (TSA), which implements both internal route selection and time-division multiplexing (TDM) for multiplexed serial channels. A TSA typically supports the serial bus rate and format for most standard TDM buses, including the T1 and CEPT highways, pulse code modulation (PCM) highway, and ISDN buses.

However, partial T1 customers are typically assigned a portion of the time slots available, and their data must be assigned to their particular time slots. Thus, when interfacing multiple T1 circuits, care must be taken to insure that data received from a first T1 data stream in corresponding time slots is properly placed onto a second T1 data stream in the proper time slots appropriate for the second data stream. Such a process is typically referred to as drop and insert, or herein as cross connect, where distinct T1 circuits and their respective time slot assignments are cross connected.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Figure 2:
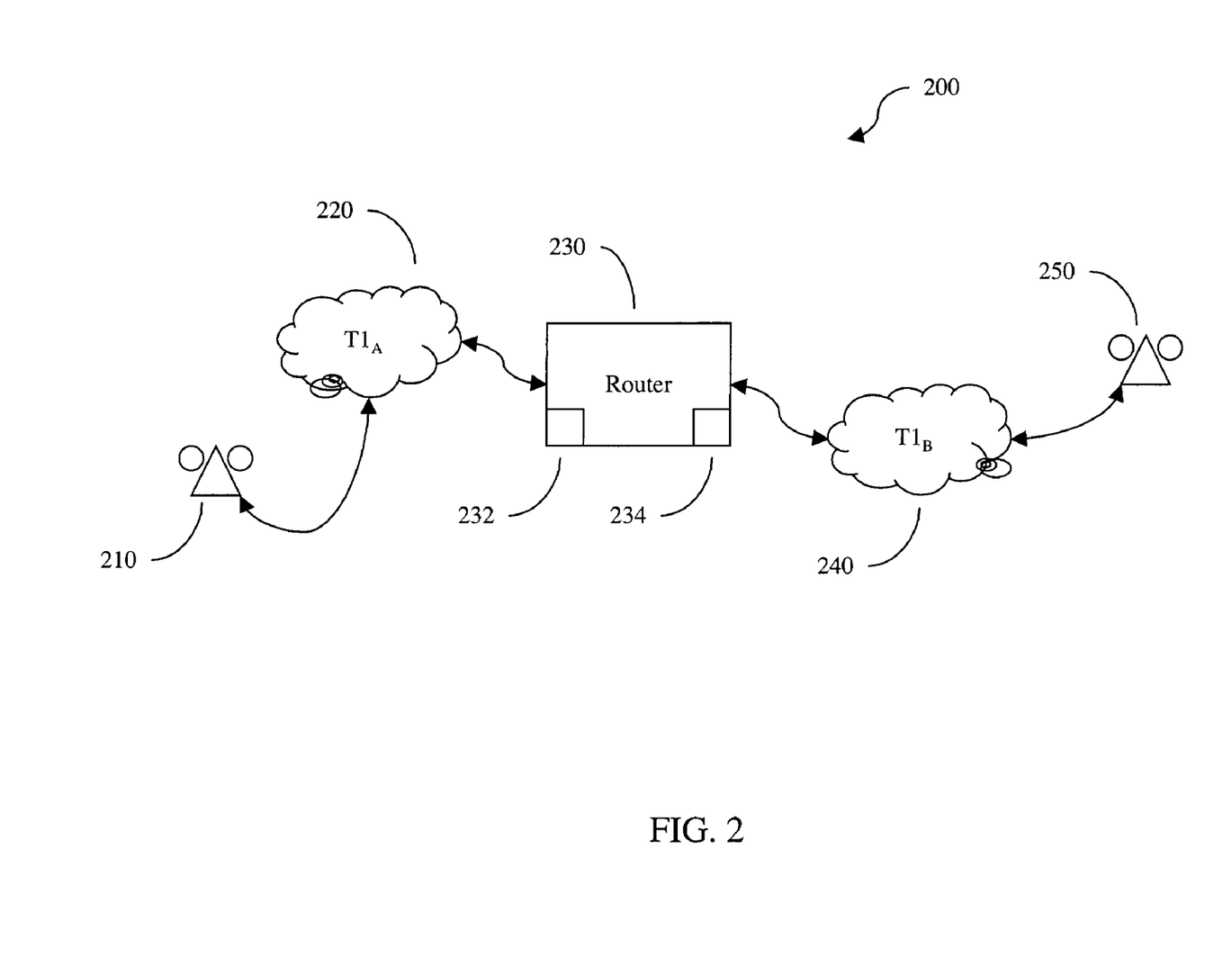
FIG. 2 is a conceptual block diagram of a cross connected system configured in accordance with the teachings of this disclosure.

FIG. 2 is a diagram of an enterprise system 200 suitable for use in the present disclosure. FIG. 2 illustrates the coupling of a first user 210 to a second user 250 through an enterprise server 230. In the example of FIG. 2, the users 210 and 250 are coupled to the enterprise through distinct T1 circuits $T1_A$ (220) and $T1_B$ (240), respectively. In the example of FIG. 2, T1 circuits 220 and 240 are cross connected using a router 230, which includes a processor 232 and associated memory 234 for executing embodiments of this disclosure. It is contemplated that any router suitable for interfacing and cross connecting T1 circuits as disclosed herein may be employed in this disclosure.

Figure 3:
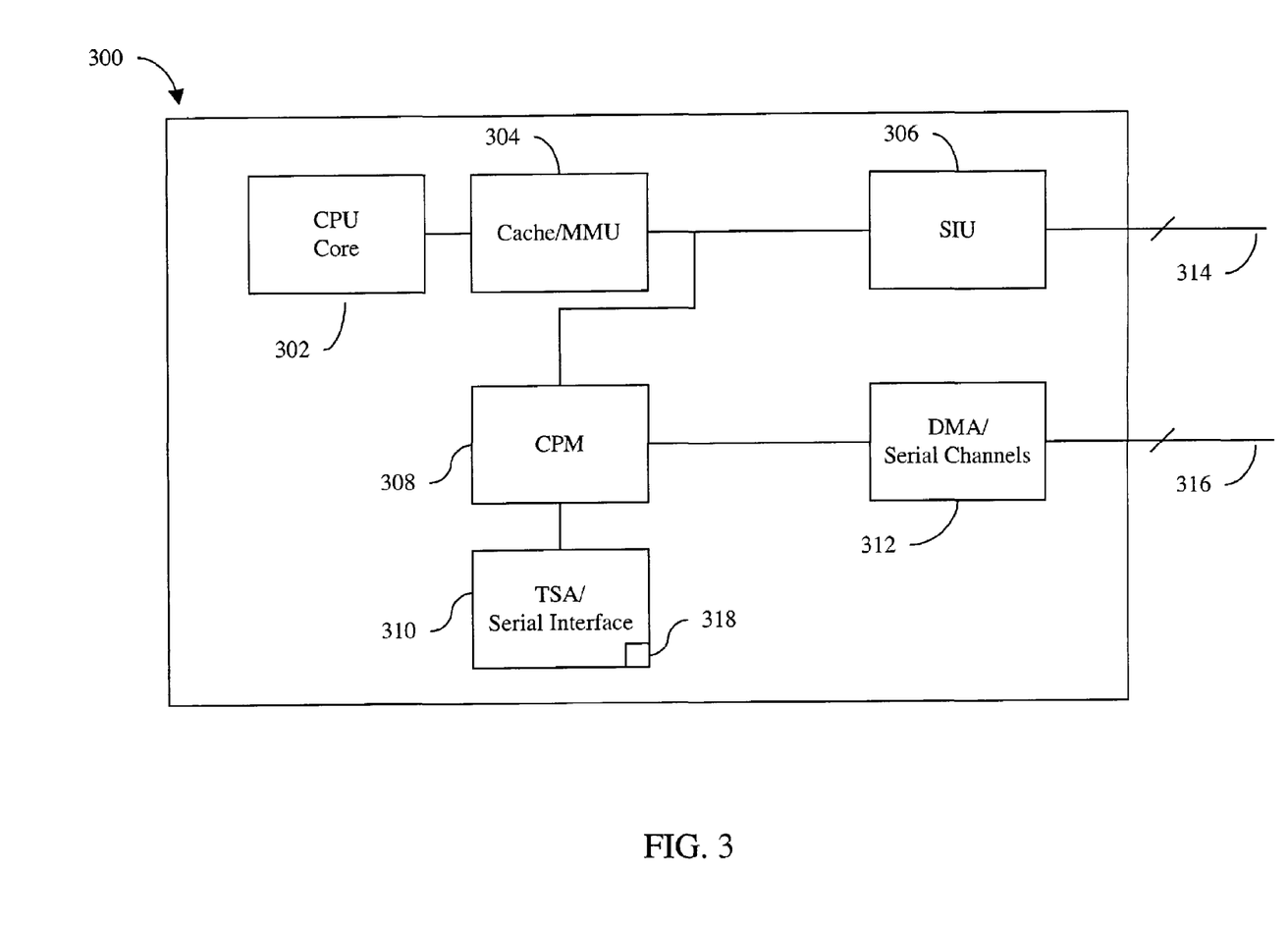
FIG. 3 is a block diagram of a processor suitable for use with this disclosure.

FIG. 3 is a functional block diagram of a processor 300 suitable for use in this disclosure. In a presently preferred embodiment, the processor 300 may comprise a MPC860 PowerPC processor from Motorola, Inc. However, it is to be understood that any equivalent or similar processors with similar components or functional equivalents thereof may be employed in the present disclosure.

The processor 300 comprises three modules that each use a 32-bit internal bus: the CPU core 302, the system integration unit (SWU) 306, and the communication processor module (CPM) 308. The processor 300 may also include a TSA/serial interface module 310 coupled to the CPM 308 for performing time slot assignment and serial interface functions. The serial interface module 310 preferably contains one or more Serial Channel Controllers (SCC) for providing serial connectivity. As will be appreciated by those of ordinary skill in the art, if there is an interface between the TSA and SCC's, the CPM may not be necessary.

The processor 300 may also include a Cache and Memory Management Unit 304 coupled to the core 302.

The processor may interface to external serial channels (shown as serial data paths 316) using a serial channel and DMA interface module 312 for interfacing DMA to RAM, and for transporting data to or from the SIU). The processor 300 may interface to external memory locations through data path 314 using the SIU 306.

The present disclosure utilizes the TSA and a spare serial port to achieve TDM cross connect through the use of the processor's SCC. A suitable processor provides a transparent loop-back or "echo" mode wherein receive data is directed towards a predetermined memory space, or the received data is transferred to a predetermined port. The present disclosure utilizes these features to accomplish cross connect as will now be shown and described.

Figure 4:
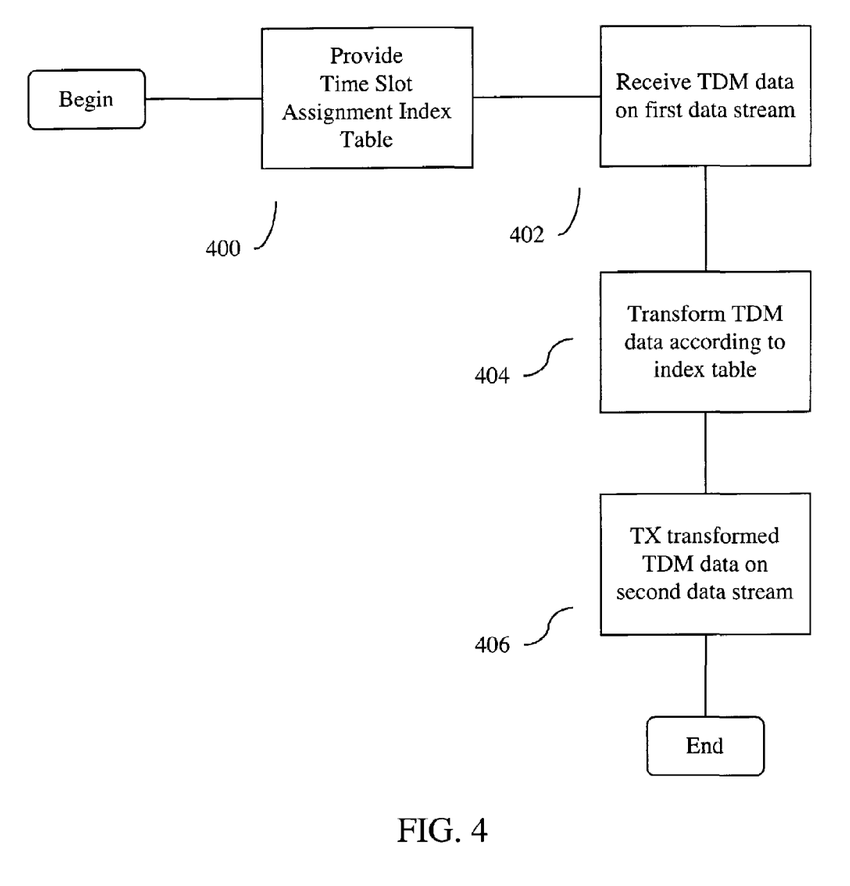
FIG. 4 is a conceptual block diagram of cross connecting two distinct data streams in accordance with the teachings of this disclosure.

FIG. 4 is a flowchart of a method of providing universal cross connect. The process begins in act 400, where a time slot assignment index table is provided. The table provided preferably provides a mapping of time slots between distinct data paths. One aspect of an index table will be provided below.

The process continues in act 402, where TDM data is received in a first data stream. The data stream may be any data stream having a data slot 1 byte wide. The data contained in the first data stream will be received according to the corresponding time slot assignment.

The process continues to act 404, where the TDM data is transformed according to the index table disclosed herein. In so transforming the TDM data, the TDM data is placed in a condition to be properly transmitted on a second data stream.

Finally, in act 406, the transformed TDM data is transmitted on a second, separate, data stream. The transformed data will be transmitted using the time slot assignment appropriate for the second data stream. The activity of receiving and transmitting data and the manipulation of bytes received to other positions in different timeslots happens concurrently.

As will be appreciated from the process of FIG. 4, the received TDM has been properly cross connected between data streams. A more detailed example will now be disclosed.

Figure 5A:
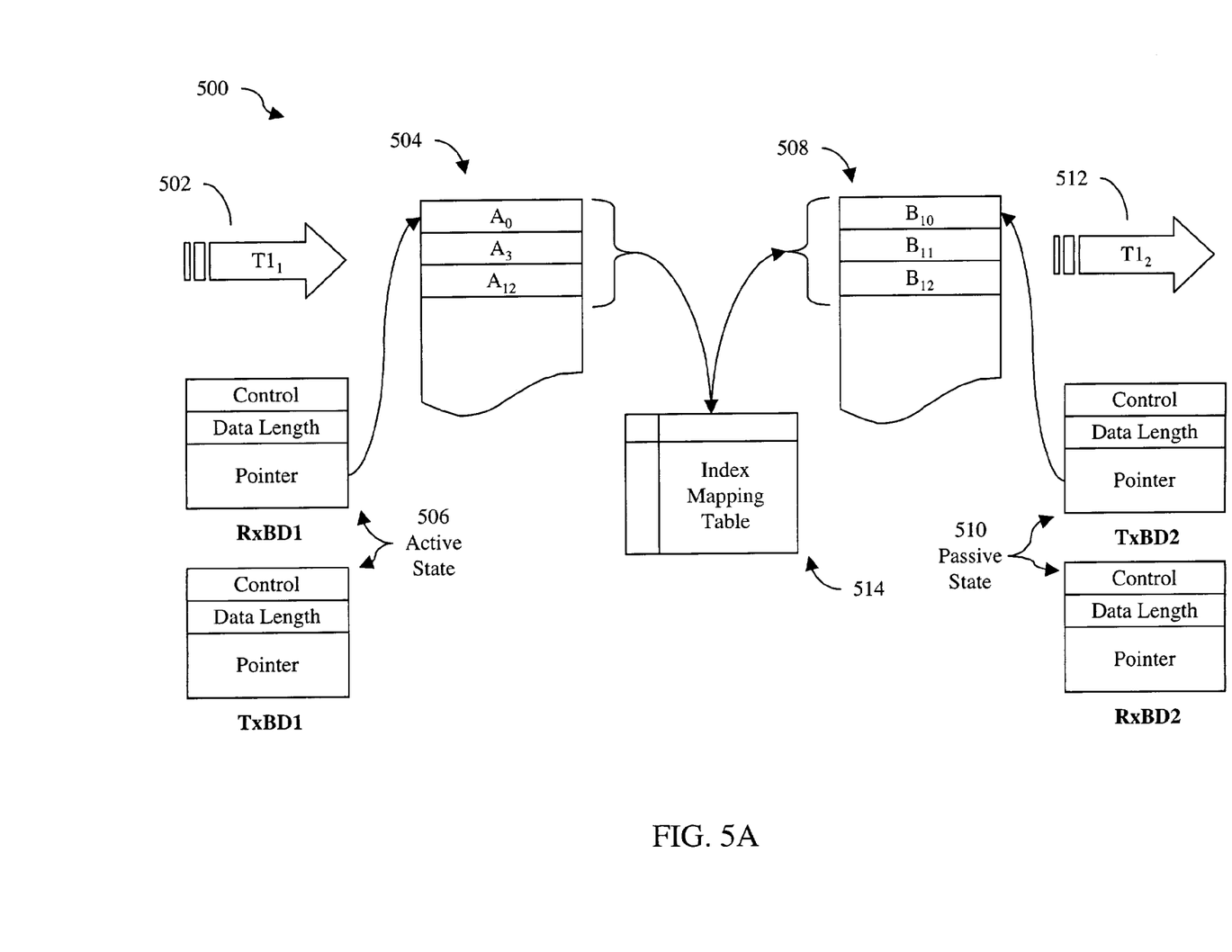
FIGS. 5A-B are conceptual diagrams of cross connecting two distinct data streams in accordance with the teachings of this disclosure.
Figure 5B:
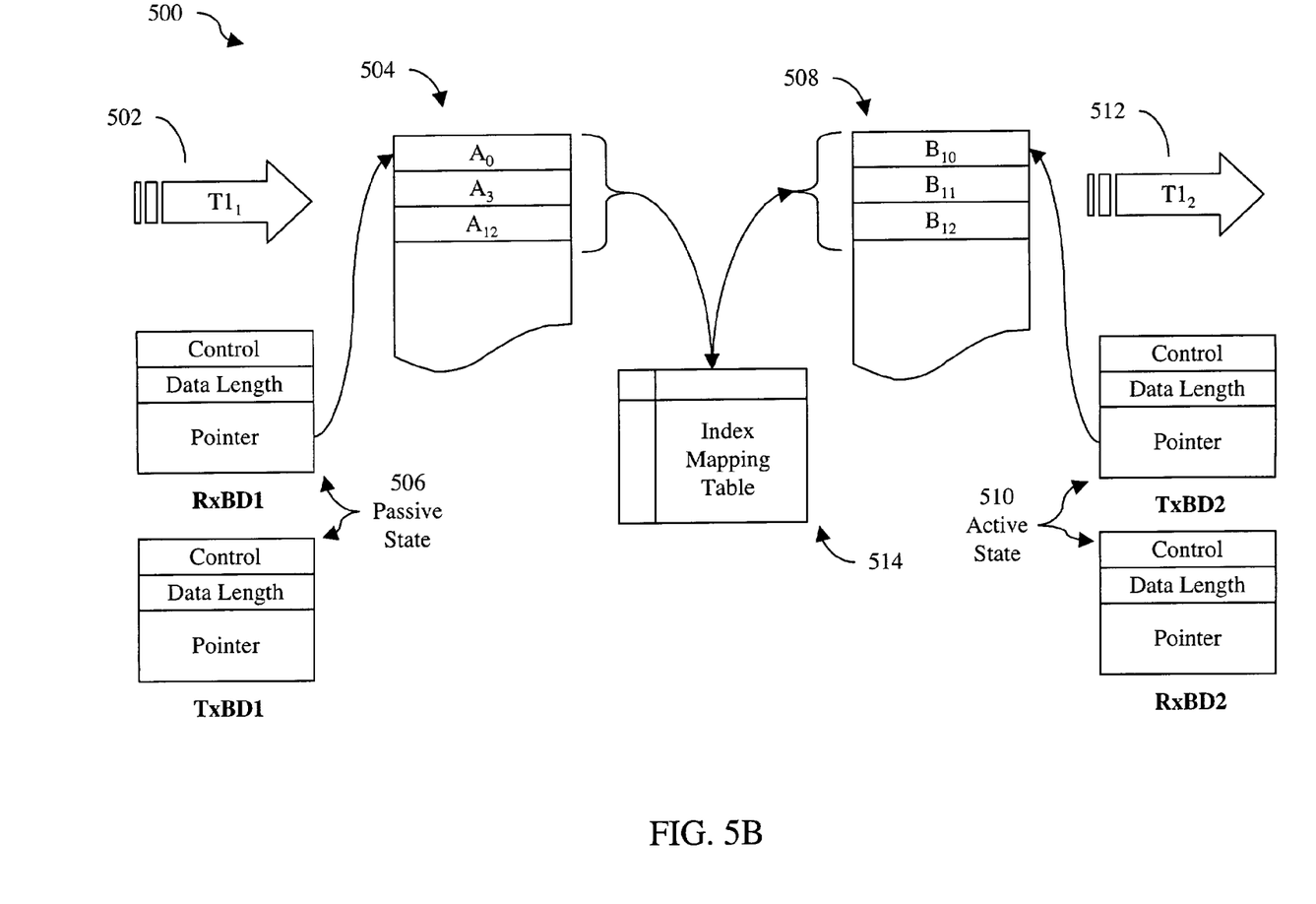

FIG. 5 are diagrams showing a further aspect of universal cross connecting according to this disclosure. In the example of FIGS. 5A-B, data segments $A_0$, $A_3$, and $A_{12}$, representing data received in time segments 0, 3, and 12, respectively of first data stream 502, to be cross connected into time slots 10, 11, and 12, respectively, of data stream 512. It will be appreciated that any number of time slots may be cross connected in any order using the benefits of this disclosure.

To accomplish the cross connect operation, the present disclosure utilizes buffer descriptors (BD) provided by the processor. In this disclosure, two types of buffer descriptors are provided, a Transmit BD (TxBD), and a Receive BD (RxBD).

The BDs of this disclosure occupy a few bytes of memory, and indicate to the serial port where in memory data is to go. The BD will also indicate how many bytes will be received. In an additional aspect, the BD may also point to the destination address in memory space. Thus, the BD may have indications of where to store received data, and/or where to retrieve data from, prior to transmission or reception.

In one disclosed aspect, the BD resides in Dual Port RAM (DP) RAM located internal to the CPU. As will be appreciated, this is precious RAM, sometimes limited to as little as 1K Bytes. In one disclosed aspect, each BD takes about 8 bytes of memory; the present disclosure may function with as little as 4 BD, or about 32 bytes of DPRAM. It is contemplated that any number of buffer descriptors may be utilized given system requirements.

In operation, it is assumed that the TSA is programmed to perform the cross connection desired. The programming of the TSA to send specific time slots to or from specific serial ports may be achieved through the use of a different TSA programming table. As will be appreciated by those of ordinary skill in the art, programming details are processor specific and may thus vary from processor to processor.

In this example, only three time slots are being programmed, though any number of available time slots may be programmed. As the TSA is now programmed, it knows how many BD it expects to receive for a given cross connect. This may take place by storing a value representing the number of time slots to cross connect.

It is further contemplated that the following operations will be performed during two phases, an active state and a passive state. It is contemplated that a RxBD and a TxBD will each be provided for each state, thus resulting in a Rx/Tx BD pair, with each pair having an active and passive state. Thus, FIGS. 5A-B show BD pair 506 comprising RxBD1 and TxBD1, and BD pair 510 comprising RxBD2 and TxBD2. As used herein, in the active state the pair is used for Tx/Rx, while in the passive state data is being shuffled around and cross connected. During a given frame, one pair of BDs is in an active state while another is in a passive state.

In FIG. 5A, the BD pair 506 is in an active state, and BD pair 510 is in a passive state. During this state, the data stream 502 provides data in times slots 0, 3, and 12, and is stored as data segments $A_0$, $A_3$, and $A_{12}$ in the memory space 504 pointed to by RxBD 506. Meanwhile, data pointed to by may be transmitted on data stream 512. After the given number of slots have been received, the CPU may be interrupted.

After the interrupt, the CPU knows how many bytes it has received and into which memory space they have been stored. In one embodiment, the Interrupt Service Routine (ISR) changes the state.

Now that the CPU has data for all time slots associated with the cross connect in memory, the CPU may now reorder the buffer in any way desired. In a preferred embodiment, the contents are reordered in memory, not the BD itself. In FIGS. 5A-B, this is shown as the data in memory space 504 being transformed according to the mapping contained in table 506. In one disclosed aspect, the table 506 may contain indexed with the Rx time slot number. Thus, in this example, the table 506 may contain:

{10, −1, −1, 11, −1, −1, −1, −1, −1, −1, −1, −1, 12, −1, −1, −1, −1, −1, −1, −1, −1, −1, −1, −1,} or,

| Arrival Time Slot | Exit Time Slot |
|---|---|
| 0 | 10 |
| 1 | −1 |
| 2 | −1 |
| 3 | 11 |
| 4 | −1 |
| 5 | −1 |
| 6 | −1 |
| 7 | −1 |
| 8 | −1 |
| 9 | −1 |
| 10 | −1 |
| 11 | −1 |
| 12 | 12 |
| 13 | −1 |
| 14 | −1 |
| 15 | −1 |
| 16 | −1 |
| 17 | −1 |
| 18 | −1 |
| 19 | −1 |
| 20 | −1 |
| 21 | −1 |
| 22 | −1 |
| 23 | −1 | indicating that data received in time slot 0 should be slotted for transmission in time slot 10, data received in time slot 3 should be slotted for transmission in time slot 11, and data received in time slot 12 should be slotted for transmission in time slot 12.

The data contained in memory space 504 may then be re-arranged according to the desired mapping, and stored in a second memory space 508 in the order appropriate for transmission out a second data stream 512.

After the data has been arranged and a TxBD2 of BD pair 510 is created pointing to the transformed data in memory space 508, the BD may be flagged for transmission. In a preferred embodiment, data is serialized out one byte at a time, and the BD remains unchanged during the serialization. At the end of Tx, an interrupt is generated which moves the BD to passive state.

The process will continue in FIG. 5B, in which the state of the BD pairs is toggled, with BD pair 506 now being in a passive state, and BD pair 510 now being in an active state. During this state, data pointed to by TxBD 2 of BD pair 510 will be transmitted on data stream 512, while data on data stream 502 will be stored in a memory space pointed to by RxBD2 of BD pair 510.

The process of FIGS. 5A-B may be repeated as long as the cross-connect is in place.

The methods of this disclosure may also be presented in pseudo-code format. In one embodiment, the cross connect method may be represented as:

TxBuffer[cross_connect[index]]→RxBuffer[index]

showing the assignment as disclosed herein. A more detailed example may be shown as:

For (all time slots) Do
       IF (TxBuffer[cross_connect[index]]>=0) THEN
          TxBuffer[cross_connect[index]]→RxBuffer[index]
       ENDIF
    END LOOP While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method of achieving universal cross connect for Time Domain Modulated (TDM) data between a first and second data streams each having a corresponding time slot assignment, said method comprising:
   providing a time slot assignment index table containing a time slot assignment correlation between a first and second data streams;
   receiving a first data stream containing TDM data having a corresponding first time slot assignment;
   transforming said data according to said time slot assignment table; and
   designating said transformed data for transmission on said second data stream with a second time slot assignment.

2. The method of claim 1, wherein said act of receiving said first data stream comprises:
   receiving, during an active state, a receive buffer descriptor (RxBD) corresponding to said received TDM data; and
   storing said received data in a first memory space pointed to by said RxBD and in an order prescribed by said first time slot assignment of said first data stream.

3. The method of claim 2, wherein said act of transforming said TDM data comprises:
   indexing said TDM data according to said time slot assignment table, resulting in transformed TDM data; and
   storing said transformed TDM data in a second memory space in an order prescribed by said second time slot assignment.

4. The method of claim 3, wherein said act of designating said transformed TDM data for transmission comprises:
   generating, during a passive state, a transmission buffer descriptor (TxBD) pointing to said second memory space containing said transformed TDM data; and
   transmitting, during the next active state, said transformed TDM data on said second data stream.

5. An apparatus for achieving universal cross connect for Time Domain Modulated (TDM) data between a first and second data streams each having a corresponding time slot assignment, comprising:
   means for providing a time slot assignment index table containing a time slot assignment correlation between a first and second data streams;
   means for receiving a first data stream containing TDM data having a corresponding first time slot assignment;
   means for transforming said data according to said time slot assignment table; and
   means for designating said transformed data for transmission on said second data stream with a second time slot assignment.

6. The apparatus of claim 5, wherein said means for receiving said first data stream further comprises:
   means for receiving, during an active state, a receive buffer descriptor (RxBD) corresponding to said received TDM data; and
   means for storing said received data in a first memory space pointed to by said RxBD and in an order prescribed by said first time slot assignment of said first data stream.

7. The apparatus of claim 6, wherein said means for transforming said TDM data comprises:
 means for indexing said TDM data according to said time slot assignment table, resulting in transformed TDM data; and
 means for storing said transformed TDM data in a second memory space in an order prescribed by said second time slot assignment.

8. The apparatus of claim 7, wherein said means for designating said transformed TDM data for transmission comprises:
 means for generating, during a passive state, a transmission buffer descriptor (TxBD) pointing to said second memory space containing said transformed TDM data; and
 means for transmitting, during the next active state, said transformed TDM data on said second data stream.

9. A program storage device readable by a machine, tangibly embodying a program of instructions executable by the machine to perform a method of achieving universal cross connect for Time Domain Modulated (TDM) data between a first and second data streams each having a corresponding time slot assignment,
 providing a time slot assignment index table containing a time slot assignment correlation between a first and second data streams;
 receiving a first data stream containing TDM data having a corresponding first time slot assignment;
 transforming said data according to said time slot assignment table; and
 designating said transformed data for transmission on said second data stream with a second time slot assignment.

10. The device of claim 9, wherein said act of receiving said first data stream comprises:
 receiving, during an active state, a receive buffer descriptor (RxBD) corresponding to said received TDM data; and
 storing said received data in a first memory space pointed to by said RxBD and in an order prescribed by said first time slot assignment of said first data stream.

11. The device of claim 10, wherein said act of transforming said TDM data comprises:
 indexing said TDM data according to said time slot assignment table, resulting in transformed TDM data; and
 storing said transformed TDM data in a second memory space in an order prescribed by said second time slot assignment.

12. The device of claim 11, wherein said act of designating said transformed TDM data for transmission comprises:
 generating, during a passive state, a transmission buffer descriptor (TxBD) pointing to said second memory space containing said transformed TDM data; and
 transmitting, during the next active state, said transformed TDM data on said second data stream.

13. An apparatus for achieving universal cross connect for Time Domain Modulated (TDM) data between a first and second data streams each having a corresponding time slot assignment, comprising:
 a router having a microprocessor operatively disposed therein, said microprocessor having memory operatively associated therewith;
 said router configured to:
 provide a time slot assignment index table containing a time slot assignment correlation between a first and second data streams;
 receive a first data stream containing TDM data having a corresponding first time slot assignment;
 transform said data according to said time slot assignment table; and
 designate said transformed data for transmission on said second data stream with a second time slot assignment.

14. The apparatus of claim 13, wherein said apparatus is further configured to receive, during an active state, a receive buffer descriptor (RxBD) corresponding to said received TDM data; and
 store said received data in a first memory space pointed to by said RxBD and in an order prescribed by said first time slot assignment of said first data stream.

15. The apparatus of clam 14, wherein said apparatus further configured to index said TDM data according to said time slot assignment table, resulting in transformed TDM data; and
 store said transformed TDM data in a second memory space in an order prescribed by said second time slot assignment.

16. The apparatus of claim 15, wherein said apparatus further configured to generate, during a passive state, a transmission buffer descriptor (TxBD) pointing to said second memory space containing said transformed TDM data; and
 transmit, during the next active state, said transformed TDM data on said second data stream.

17. An apparatus for providing cross connect between a first and second data stream comprising:
 a router operatively coupled to the first and second data streams for sending and receiving Time Domain Multiplexed (TDM) data on said data streams;
 said router having a processor including a Time Slot Assigner (TSA) and at least one free serial port; and
 said router being configured to cross connect said TDM data between said first and second data streams.

18. The apparatus of claim 17, said apparatus being further configured to provide a time slot assignment index table containing a time slot assignment correlation between a first and second data streams.

19. The apparatus of claim 18, said apparatus being further configured to receive a first data stream containing TDM data having a corresponding first time slot assignment, and transform said data according to said time slot assignment table.

20. The apparatus of claim 19, said apparatus being further configured to designate said transformed data for transmission on said second data stream with a second time slot assignment.

21. The apparatus of claim 20, said apparatus being further configured to receive, during an active state, a receive buffer descriptor (RxBD) corresponding to said received TDM data; and store said received data in a first memory space pointed to by said RxBD and in an order prescribed by said first time slot assignment of said first data stream.

22. The apparatus of claim 21, wherein said apparatus further configured to index said TDM data according to said time slot assignment table, resulting in transformed TDM data.

23. The apparatus of claim 22, said apparatus being further configured to store said transformed TDM data in a second memory space in an order prescribed by said second time slot assignment.

24. The apparatus of claim 23, said apparatus being further configured to generate, during a passive state, a transmission buffer descriptor (TxBD) pointing to said second memory space containing said transformed TDM data.

25. The apparatus of claim 24, said apparatus being further configured to transmit, during the next active state, said transformed TDM data on said second data stream.

* * * * *